(No Model.)
W. VOGLER.
DRESS FORM.
No. 408,770. Patented Aug. 13, 1889.
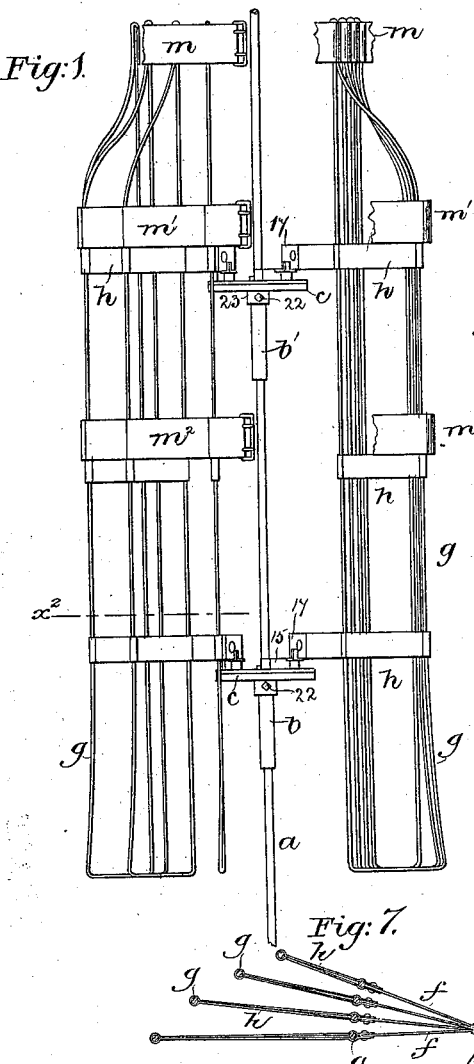
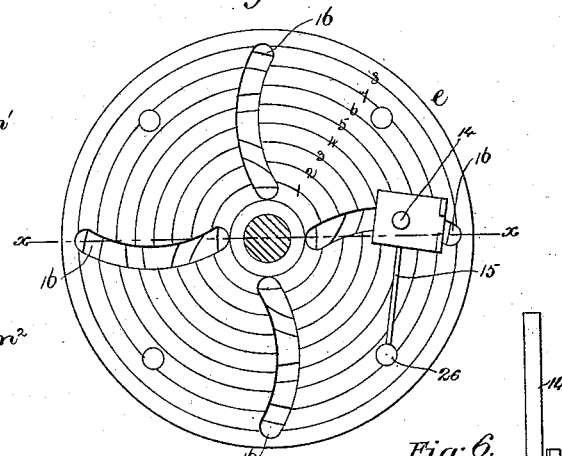
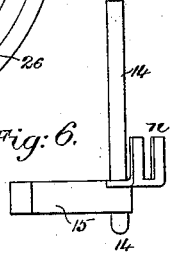
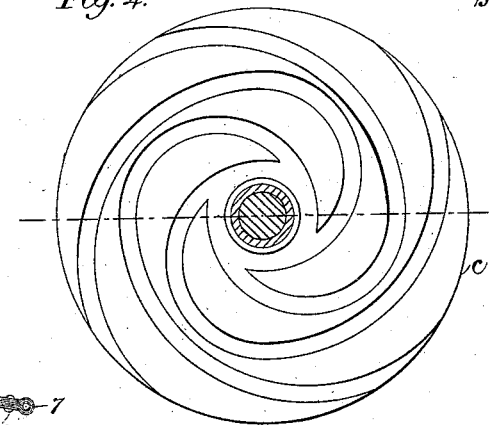
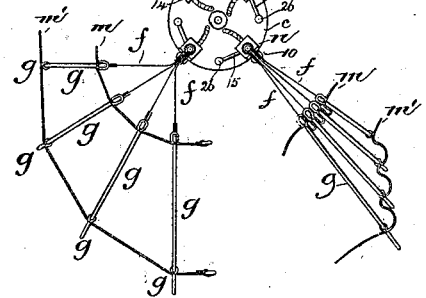
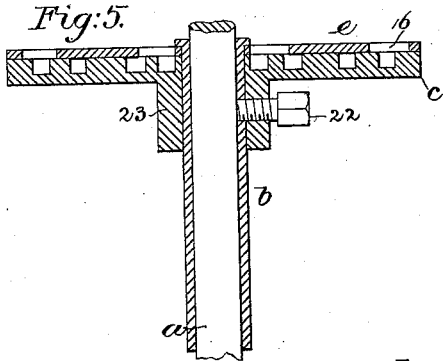
Witnesses:
Howard F. Eaton.
Frederick L. Emery.
Inventor:
William Vogler,
by Crosby & Gregory
Attys

UNITED STATES PATENT OFFICE.

WILLIAM VOGLER, OF SOMERVILLE, MASSACHUSETTS.

DRESS-FORM.

SPECIFICATION forming part of Letters Patent No. 408,770, dated August 13, 1889.

Application filed November 20, 1888. Serial No. 291,343. (No model.)

*To all whom it may concern:*

Be it known that I, WILLIAM VOGLER, of Somerville, county of Middlesex, State of Massachusetts, have invented an Improvement in Dress-Forms, of which the following description, in connection with the accompanying drawings, is a specification, like letters on the drawings representing like parts.

This invention is an improvement on the dress-form described in my application, Serial No. 283,746. That application shows and describes a dress-form having a series of wings, each series being pivoted upon a single arm or rod, which is in turn pivoted upon a plate carried by a central rod or standard.

In this my present invention the wings, shown as composed of wire bent and held together by metal braces, are attached each to a spring-arm, and the said arms are arranged in groups and connected together at one end, each group of arms being adjustably pivoted upon or with relation to a disk or plate mounted upon the usual standard. The wings of each group when the form is in use are kept separated or spread by straps connected to their outer edges. The wings may be moved toward or from the standard by a cam. The straps of the different wings are connected together when it is desired that the wings be spread apart and the form be in position for use.

My invention in a dress-form consists, essentially, in a series of wings and a series of spring-arms to which the said wings are connected at one end, the other ends of the said arms being joined together, as will be described, combined with a series of studs forming pivotal points for the connected ends of the spring-arms and supports for the studs, substantially as will be described.

Other features of my invention will be hereinafter more specifically pointed out in the claims at the end of this specification.

Figure 1 in elevation represents one-half of a dress-form embodying my present invention; Fig. 2, a plan or top view thereof, showing two sets of wings, one set being, however, represented as distended for use while the other set is folded up. Fig. 3 is an enlarged top view showing the disk or plate and the cam below it provided with cam-grooves. Fig. 4 is a top view of the cam. Fig. 5 is a section on the line $x$, Fig. 3. Fig. 6 is a side elevation of one of the lever-arms and its stud and holder; and Fig. 7, an enlarged sectional detail below the line $x^2$, showing one set of wings, their braces, and spring-arms to which the braces are connected.

The standard $a$ will in practice rise from any suitable base or foot (not shown) adapted to stand on the floor. The standard $a$ is surrounded at two points with sleeves $b\ b'$, which are held in adjusted position vertically on the standard by like set-screws 22, the said set-screws also entering the hubs 23 of the scroll or snail cams $c$, having a series of grooves of such shape as to receive and act upon the ends of pins or studs 14, carried by and extended below the free ends of like lever-arms 15, (shown as pivoted by pins 26 to a plate $e$,) the lower ends of the said studs 14 moving in the slots 16 in the said plate $e$, the upper end of each of the said studs receiving upon it an eye at the inner end of each of the groups of spring-arms $f$, carrying the wings $g$, there being, as herein shown, four such spring-arms and wings to each group, the form having in practice four or more groups of wings. The spring-arms of each group of wings are composed of pieces of sheet metal laid parallel and connected at one end in suitable manner, as by a clip 17, bent to form an eye to fit the stud 14 loosely, the clip being shown as connected to the spring-arms by a rivet 10, extended through the clip and spring-arms.

The outer ends of the spring-arms $f$, as herein shown, (see Fig. 7,) are riveted between the metal braces $h$, herein represented as composed each of a piece of tin bent upon itself to embrace the wire of the wings, as in Figs. 1 and 7. The wings, for sake of lightness, are of wire bent into proper shape. Each group of wings has applied to it, as shown, three straps $m\ m'\ m^2$, the points of attachment of the different wings of each set of wings to the straps being at a distance apart corresponding with the distance apart which it is desired that the wings shall stand in the group of wings when the wings are expanded, as at the left of Fig. 2.

To keep each group of wings extended and the form in working position the ends of the like straps $m$ $m'$ $m^2$ of all the wings will be buckled or fastened together. When the straps are not so connected, the wings of each group may be closed, as at the right of Fig. 2. When the form is to be set away, the operator will turn the stand and cams while holding the wings, so that the pins 14 in the grooves of the cams will be moved in toward the standard, the slot 16 permitting such movement, or the plates $e$ may be turned, the standard and cam-plates remaining stationary. The lever-arms 15 are shown as provided with holders $n$, composed of pieces of metal upturned and slotted, as shown best in Fig. 6. The spring-arms enter and rest in the slots of the holders $n$ when the wings are to be held out in use, the said holders preventing any side turning of the spring-arms on the stud 14, and holding the group of arms in place while the individual arms of a group are spread apart by the strap $m$ or $m'$, &c. When all the wings of the four groups are to be folded closely together, the spring-arms will be lifted on the studs sufficiently to clear them from the notches. By the cams $c$ $c$ the studs may be made to occupy positions more or less distant from the rod $a$, thus securing the proper diameter for the entire form. The farther the studs 4 from the rod $a$ the greater the diameter of the form, and vice versa.

The cap-plate $e$, as shown in Fig. 3, is provided with a series of indication-marks, (see Fig. 3,) shown as circular lines numbered from 1 to 8, the said marks and figures forming a scale or indicator to enable the user of the form to adjust each group of wings into the proper position according to the size desired for the diameter of the form.

I claim—

1. In a dress-form, a series of wings, and a series of spring-arms, as $f$, arranged in groups to which the said wings are connected at one end, the other ends of the said groups of arms being joined together to form a clip or eye, as described, combined with a series of studs forming pivotal points for the connected ends of the group of spring-arms, and pivoted supports for the studs, substantially as described.

2. In a dress-form, a standard, cams thereon, slotted plates $e$, adjacent to said cams and rotatable with relation thereto, arms 15 and studs 14, extended through said plates $e$, engaging with and made movable by the said cams toward and from the said standard by rotation of plates $e$, combined with a series of arms, as $f$, connected together at one end and pivotally supported by the said studs, and with wings connected to the outer ends of the said arms, substantially as described.

3. In a dress-form, a standard, rotatable plates thereon, spring-arms $f$, pivoted thereto, and a series of pivoted wings arranged in groups and supported at the outer end of said spring-arms, the said groups of wings being each composed of several wings, as $g$, normally held together by said spring-arms, the arms being connected together at their inner ends, as described, and with a series of flexible straps, as $m$, at their outer ends to separate the wings one from the other and hold them in such position, substantially as described.

4. In a dress-form, a standard, cam-plates thereon, and rotatable slotted plates $e$, having an index or scale and concentric with said cam-plate, combined with the arms 15, pivoted upon the plates $e$, and having pins 14, and with a series of adjustable wings supported at their inner ends by the said pins, substantially as described.

5. In a dress-form, a standard, cam-plates thereon, and slotted plates $e$, adjacent thereto and having an index or scale, combined with the pivoted arms 15, having pins 14, extended through said plates $e$, and having slotted holders $n$, and with a series of adjustable wings held in said slotted holders and supported by the said pins, substantially as described.

In testimony whereof I have signed my name to this specification in the presence of two subscribing witnesses.

WILLIAM VOGLER.

Witnesses:
 B. DEWAR,
 A. S. WIEGAND.